Patented May 5, 1953

2,637,701

UNITED STATES PATENT OFFICE 2,637,701

SURFACE-ACTIVE PRODUCTS

Edward L. Doerr, Dayton, Ohio, assignor to Monsanto Chemical Company, St. Louis, Mo., a corporation of Delaware No Drawing. Application December 28, 1950,
Serial No. 203,205

10 Claims. (Cl. 252—351)

This invention relates to surface-active products of the polyalkylene oxide type.

Condensates produced by condensing alkyl mercaptans with ethylene or propylene oxide have been prepared and have found utility as surface-active agents. Alkyl mercaptans of the primary, secondary and tertiary types have been condensed with ethylene oxide and within certain molecular ratios of ethylene oxide have been found to be effective wetting agents and detergents. Of the alkylene oxides which have been suggested for this purpose, ethylene oxide has, in general, given products having more pronounced surface-active properties than the 1,2-propylene oxide, the latter compound giving, in general, relatively insoluble condensates.

The ethylene oxide condensation products of tertiary alkyl mercaptans, wherein the alkyl groups have from 8 to 16 carbon atoms have shown a pronounced surface-activity (wetting and detergency) when these products are compared with normal straight chain primary mercaptans in aqueous solution.

This fact, coupled with the relative availability of the tertiary alkyl mercaptans from petroleum hydrocarbon sources at a low price compared with the normal straight chain mercaptans, has led to considerable commercial interest in these products.

The tertiary alkyl mercaptans having from 8 to 16 carbon atoms in the alkyl chain which are available from petroleum hydrocarbon sources, however, possess a highly objectionable odor and while there is some diminution of intensity of odor after reaction of these mercaptans with ethylene oxide the residues of the odor still persist to a sufficient extent so that it is distinctly noticeable upon textile products treated with such products. It has, accordingly, been proposed to treat the condensation products by methods involving acidification, followed by steam distillation, which processes have been found to somewhat diminish the odor. Unfortunately, this after-treatment of the condensation product is expensive and, furthermore, does not completely eliminate the odor.

I have now found that if tertiary alkyl mercaptans having from 8 to 16 carbon atoms in the alkyl group are mixed with an aliphatic alcohol having from 8 to 16 carbon atoms to produce a mixture which contains at least 1% by weight of the said alcohol, preferably at least 5%, but not in excess of 50% thereof, and the mixture then condensed with ethylene oxide a valuable surface-active product is obtained which is surprisingly free of residual mercaptan odor. The condensation is preferably conducted in the presence of an alkaline catalyst and continued until at least 3 moles of ethylene oxide has combined with each mole of mercaptan and alcohol present in the mixture.

The tertiary alkyl mercaptans which I employ are those in which the sulfur atom is joined to a carbon atom of the alkyl group, which carbon atom is joined to three other carbon atoms. Suitable tertiary mercaptans are those derived from polymer olefins which may be obtained, for example, by polymerizing lower olefins such as propylene or butylene, or mixtures thereof. Such polymerization of lower olefins yields materials which are characterized as the dimer, trimer, tetramer or pentamer of propylene or the dimer, trimer or tetramer of isobutylene. It is also possible to obtain copolymers of propylene and isobutylene by polymerization of mixtures (codimers) thereof. Such olefin polymers of petroleum aliphatic origin are liquid materials and are readily converted to the corresponding tertiary mercaptans by catalytic sulfhydration by reaction with hydrogen sulfide. The process of sulfhydration is more fully described in Industrial and Engineering Chemistry, 40, 2308 (1948).

The reaction involved in the present process by which the odoriferous constituents in the mercaptan are rendered less obnoxious is not completely understood, but appears to result from the conjoint condensation of ethylene oxide with the mixtures of the tertiary mercaptans and the alcohols. Apparently the elimination of odoriferous constituents is not obtained, at least to the same high degree, by the mixing together of the preformed condensation products.

The condensation of the mixed tertiary mercaptans and alcohols with ethylene oxide should be carried to the point where at least 3 moles of ethylene oxide has condensed with each mole of mercaptan in the mixture. The alcohol present will then have been condensed with at least 2 moles of ethylene oxide per mole of alcohol. At this point the odoriferous constituents will have been substantially eliminated, or at least rendered unobjectionable.

The condensation may be continued until as much as 20 moles of ethylene oxide have been condensed with each mole of mercaptan present, although if desired more ethylene oxide may be added.

The invention is further illustrated by means of the following examples. In the following examples percentages and parts are by weight.

EXAMPLE 1

A 500 cc. glass reactor was provided with a heating mantel, a gas inlet tube carrying a gas dispersing device, a stirrer, a thermometer and a gas outlet. To the reactor was charged the following materials: 142.5 g. tertiary dodecyl mercaptan derived from triisobutylene, 7.5 g. (5% of the mercaptan-alcohol mixture) of tridecyl alcohol derived by the Oxo reaction from triisobutylene and 3.0 g. of KOH.

The temperature was first raised to 120° C. and gaseous ethylene oxide passed into the mixture of mercaptan and alcohol until 255 g. (5.8 moles) had combined with the mixture.

25 cc. of water were then added and a stream of carbon dioxide passed in for the purpose of neutralizing the free caustic potash in the product. The neutralized product was filtered and obtained as a clear, light yellow oil having a pleasant odor.

Since ethylene oxide is considerably more reactive with tertiary mercaptans than with the alcohol employed, it is believed that the ethylene oxide first reacts with the mercaptan to form the tertiary alkyl thioethanol ($RSC_2H_4OH$). After the tertiary mercaptan has been substantially converted to the corresponding thioethanol, the reactivity of the resulting thioethanol and the alcohol are about equal so that further reaction with ethylene oxide probably occurs with these materials at about the same rate. Under these circumstances, the final product consists of a mixture of the mercaptan-ethylene oxide condensation product containing on the average 7.52 moles of condensed ethylene oxide per mole of mercaptan and the condensation product of the alcohol-ethylene oxide condensation product containing on the average 6.52 moles of condensed ethylene oxide.

EXAMPLE 2

The procedure described in Example 1 was carried out upon a mixture containing 142.5 g. of a tertiary dodecyl mercaptan derived from tetrapropylene in place of the mercaptan derived from triisobutylene.

The product in this case was also a light yellow oil having a pleasant odor.

EXAMPLE 3

The procedure described in Example 1 was carried out employing the following reactants: 142.5 g. of tertiary dodecyl mercaptan derived from tetrapropylene and 7.5 g. of 5-ethylnonanol-2.

The process yielded the polyethylene glycol condensate of tertiary dodecyl mercaptan mixed with the polyethylene glycol condensate of 5-ethylnonanol-2 as a clear yellow oil of pleasant odor.

EXAMPLE 4

The process described in Example 1 above was repeated employing 5% of normal dodecyl alcohol in the alcohol-mercaptan mixture. The product obtained was a clear yellow oil of a mild, pleasant odor.

EXAMPLE 5

The process described in Example 1 above was carried out employing 2-ethylhexanol-1 in place of the alcohol described above. The product obtained also possessed a mild, pleasant odor.

EXAMPLE 6

The process described in Example 1 above was carried out employing a mixture of tertiary dodecyl mercaptan derived from tetrapropylene and hydrogen sulfide mixed with 7-ethyl-2-methyl-4-undecanol. The product obtained was a clear yellow oil having only a mild mercaptan-like odor.

EXAMPLE 7

The process described in Example 1 above was carried out upon a mixture of tertiary dodecyl mercaptan derived from a propylene polymer mixed with normal tetradecanol. The product was a clear yellow oil which had only a very mild mercaptan-like odor.

EXAMPLE 8

The process described in Example 1 above was carried out employing a mixture of tertiary dodecyl mercaptan derived from a propylene polymer and 2-octanol. The product was a clear yellow oil in which no mercaptan odor could be detected.

EXAMPLE 9

The process described in Example 1 above was carried out employing a mixture of tertiary dodecyl mercaptan derived from a propylene polymer mixed with 2-butyloctanol-1. The product was a clear yellow oil retaining only a trace of the characteristic mercaptan odor in very mild form.

EXAMPLE 10

The process described in Example 1 was carried out upon an alcohol-mercaptan mixture consisting of 55% by weight of tertiary octyl mercaptan and 45% by weight of tridecyl alcohol. A total of 5.8 moles of ethylene oxide per mole of alcohol and 6.8 moles of ethylene oxide per mole of mercaptan was added to the mixture. The amount of ethylene oxide condensed corresponds to 170 parts per 100 parts of the alcohol-mercaptan mixture. The odor of the product was substantially diminished over that exhibited by the mercaptan-ethylene oxide condensation product itself.

EXAMPLE 11

The alcohol-mercaptan mixture referred to in Example 10 above, was condensed with 228 parts of ethylene oxide per 100 parts of the mixture. The product obtained contained 7.9 moles of ethylene oxide per mole of alcohol and 8.9 moles of ethylene oxide per mole of mercaptan. The odor of the mercaptan was substantially diminished.

EXAMPLE 12

The process described in Example 1 was carried out upon an alcohol-mercaptan mixture consisting of 75% of tertiary tetradecyl mercaptan and 25% of 5-ethylnonanol-2. A series of two products differing in amount of condensed ethylene oxide was produced. The two products prepared contained, respectively, 170 parts and 228 parts of condensed ethylene oxide per part of the alcohol-mercaptan mixture. The products produced are identified as 12(a) and 12(b), respectively. There was no detectable mercaptan odor present in the products.

EXAMPLE 13

The process described in Example 1 was carried out upon an alcohol-mercaptan mixture consisting of 85% of tertiary dodecyl mercaptan and 15% of 2-ethylhexanol. A series of three products differing in the amount of condensed ethylene oxide was produced. The three products prepared contained, respectively, 170, 220 and 296 parts per 100 parts of alcohol-mercaptan mixture. These products are identified as 13(a), 13(b) and 13(c), respectively. All of the products produced showed no trace of mercaptan odor, but, on the other hand, did retain a slight trace of the 2-ethylhexanol odor.

The products disclosed in the above examples were evaluated according to the well-known Draves test, whereby the speed of wetting of dilute aqueous solutions of the products was determined. The results of the test are summarized in the table below:

*Speed of wetting (Draves test)*

| Conc., Percent | 0.5 | 0.25 | 0.125 | 0.062 | 0.031 |
|---|---|---|---|---|---|
| Prod. of Ex. 1 | Inst. | 2.6 | 4.8 | 10.2 | 39.8 |
| Prod. of Ex. 2 | 3.3 | 4.7 | 7.7 | 17.0 | 54.0 |
| Prod. of Ex. 3 | Inst. | 2.8 | 6.5 | 14.4 | 42.5 |
| Prod. of Ex. 4 | 3.3 | 5.5 | 8.3 | 15.5 | 33.5 |
| Prod. of Ex. 5 | 3.0 | 4.0 | 8.8 | 14.0 | 37.4 |
| Prod. of Ex. 6 | 2.9 | 4.1 | 8.0 | 17.3 | 35.9 |
| Prod. of Ex. 7 | 3.4 | 5.0 | 8.7 | 18.7 | 39.6 |
| Prod. of Ex. 8 | 3.6 | 5.0 | 8.2 | 11.1 | 32.7 |
| Prod. of Ex. 9 | 2.8 | 3.3 | 6.3 | 11.8 | 31.0 |
| Prod. of Ex. 10 | 4.1 | 10.6 | 41.3 | 52.1 | 180+ |
| Prod. of Ex. 11 | 2.8 | 7.1 | 20.4 | 86.4 | 180+ |
| Prod. of Ex. 12(a) | 3.0 | 5.2 | 15.5 | 51.0 | 96.0 |
| Prod. of Ex. 12(b) | 5.3 | 10.9 | 26.9 | 73.1 | 180+ |
| Prod. of Ex. 13(a) | Inst. | 3.0 | 6.2 | 19.1 | 32.3 |
| Prod. of Ex. 13(b) | Inst. | 3.7 | 9.9 | 21.6 | 52.2 |
| Prod. of Ex. 13(c) | 4.5 | 9.2 | 18.8 | 63.9 | 180+ |

What I claim is:

1. The condensation product of ethylene oxide with a mixture of a tertiary alkyl mercaptan having at least 8 and not in excess of 16 carbon atoms in the alkyl group, and an aliphatic monohydric alcohol having from 8 to 16 carbon atoms, said mixture containing at least 1% of said alcohol but not in excess of 50% thereof.

2. The condensation product of ethylene oxide with a mixture of a tertiary alkyl mercaptan having at least 8 and not in excess of 16 carbon atoms in the alkyl group with an aliphatic monohydric alcohol having from 8 to 16 carbon atoms, said mixture containing at least 1% of said alcohol, but not in excess of 50% thereof, said condensation containing at least 3 moles of condensed ethylene oxide per mole of total mercaptan and alcohol in said mixture.

3. The condensation product of ethylene oxide with a mixture of a tertiary alkyl mercaptan and an aliphatic monohydric alcohol, said mercaptan having at least 8 and not in excess of 16 carbon atoms in the alkyl group, and said alcohol having in excess of 8 but not in excess of 16 carbon atoms in the molecule, said mixture of mercaptan and alcohol having at least 5% but not in excess of 50% by weight of alcohol, said condensation product containing at least 3 moles of condensed ethylene oxide per mole of mercaptan.

4. The condensation product of ethylene oxide with a mixture of tertiary dodecyl mercaptan and an aliphatic monohydric alcohol having at least 8 and not in excess of 16 carbon atoms in the molecule, said mixture of mercaptan and alcohol having at least 1% but not in excess of 50% by weight of alcohol, said condensation product containing at least 3 moles of condensed ethylene oxide per mole of mercaptan.

5. The condensation product of ethylene oxide with a mixture of tertiary dodecyl mercaptan and a monohydric tridecyl alcohol, said mixture of mercaptan and alcohol having at least 1% but not in excess of 50% by weight of said tridecyl alcohol, said condensation product containing at least 3 moles of condensed ethylene oxide per mole of mercaptan.

6. The condensation product of ethylene oxide with a mixture of tertiary dodecyl mercaptan and 5-ethylnonanol-2, said mixture of mercaptan and alcohol having at least 1% but not in excess of 50% by weight of said 5-ethylnonanol-2, said condensation product containing at least 3 moles of condensed ethylene oxide per mole of mercaptan.

7. The condensation product of ethylene oxide with a mixture of tertiary dodecyl mercaptan and normal dodecyl alcohol, said mixture of mercaptan and alcohol having at least 1% but not in excess of 50% by weight of said normal dodecyl alcohol, said condensation product containing at least 3 moles of condensed ethylene oxide per mole of mercaptan.

8. The condensation product of ethylene oxide with a mixture of tertiary dodecyl mercaptan and 2-ethylhexanol-1, said mixture of mercaptan and alcohol having at least 1% but not in excess of 50% by weight of said 2-ethylhexanol-1, said condensation product containing at least 3 moles of condensed ethylene oxide per mole of mercaptan.

9. The condensation product of ethylene oxide with a mixture of tertiary dodecyl mercaptan and 2-butyloctanol-1, said mixture of mercaptan and alcohol having at least 1% but not in excess of 50% by weight of said 2-butyloctanol-1, said condensation product containing at least 3 moles of condensed ethylene oxide per mole of mercaptan.

10. The process for producing condensation products which comprises reacting ethylene oxide with a mixture of a tertiary alkyl mercaptan having at least 8 and not in excess of 16 carbon atoms in the alkyl group and an aliphatic monohydric alcohol having from 8 to 16 carbon atoms, said mixture containing at least 1% of said alcohol but not in excess of 50% thereof, and continuing the reaction until at least 3 moles of ethylene oxide has condensed per mole of mercaptan and alcohol in said mixture.

EDWARD L. DOERR.

References Cited in the file of this patent

UNITED STATES PATENTS

| Number | Name | Date |
|---|---|---|
| 2,494,610 | Davidson et al. | Jan. 17, 1950 |
| 2,514,982 | Walters et al. | July 11, 1950 |